(12) United States Patent
Kline et al.

(10) Patent No.: US 11,042,835 B2
(45) Date of Patent: Jun. 22, 2021

(54) POINT OF PURCHASE PACKAGING

(71) Applicant: INTERNATIONAL BUSINESS MACHINES CORPORATION, Armonk, NY (US)

(72) Inventors: Eric V. Kline, Rochester, MN (US); Christopher Blake, San Francisco, CA (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 16/280,185

(22) Filed: Feb. 20, 2019

(65) Prior Publication Data
US 2020/0262658 A1 Aug. 20, 2020

(51) Int. Cl.
| | | |
|---|---|---|
| *G06Q 10/08* | (2012.01) | |
| *G06F 40/40* | (2020.01) | |
| *G06Q 30/02* | (2012.01) | |
| *B65G 1/137* | (2006.01) | |
| *B65G 43/10* | (2006.01) | |

(Continued)

(52) U.S. Cl.
CPC .......... *G06Q 10/087* (2013.01); *B65B 57/00* (2013.01); *B65G 43/10* (2013.01); *G06F 40/40* (2020.01); *G06Q 30/0238* (2013.01); *G06Q 30/0281* (2013.01); *G06Q 30/0601* (2013.01); *G06Q 30/0633* (2013.01); *G07G 1/0018* (2013.01); *B65G 2203/0258* (2013.01); *B65G 2203/042* (2013.01)

(58) Field of Classification Search
CPC ................................................. G06Q 30/0281
See application file for complete search history.

(56) References Cited

U.S. PATENT DOCUMENTS

| | | |
|---|---|---|
| 3,039,248 A | 6/1962 | Jones |
| 5,083,638 A | 1/1992 | Schneider |

(Continued)

FOREIGN PATENT DOCUMENTS

CN 107909124 A 4/2018

OTHER PUBLICATIONS

Youtube, "Conveyor Belt Can Move Packages in Any Direction", https://www.youtube.com/watch?v=XAokGOEjAFs, printed Jan. 4, 2019, pp. 1-2.

(Continued)

*Primary Examiner* — Thomas Randazzo
(74) *Attorney, Agent, or Firm* — Tihon Poltavets

(57) ABSTRACT

A method for point of purchase packaging includes responsive to receiving a selection of an object at a point of purchase, identifying a purchaser defined instruction associated with the selected object for sorting and packaging by a conveyor system. Responsive to sorting the plurality of objects based on data received and the purchaser defined instruction associated with the selected object, the method instructs an automated packaging system to package the plurality of objects based on the sorting. Responsive to determining a first portion of the plurality of objects are packaged for collection at the point of purchase, the method instructs the conveyor system to send the first portion of the plurality of objects to a first transfer station at the point of purchase for collection by a purchaser of the portion of the plurality of objects.

15 Claims, 4 Drawing Sheets

(51) Int. Cl.
*G07G 1/00* (2006.01)
*B65B 57/00* (2006.01)
*G06Q 30/06* (2012.01)

(56) References Cited

U.S. PATENT DOCUMENTS

| | | | |
|---|---|---|---|
| 7,050,938 B1* | 5/2006 | Prater | G06Q 10/087 702/174 |
| 8,401,915 B1* | 3/2013 | Kim | G06Q 30/0641 705/26.1 |
| 8,590,788 B1 | 11/2013 | Sarma | |
| 8,787,707 B1 | 7/2014 | Steves et al. | |
| 8,818,873 B1* | 8/2014 | Kim | G06Q 30/0601 705/17 |
| 9,415,425 B2 | 8/2016 | Panunto | |
| 9,932,145 B1* | 4/2018 | Jeon | B65D 81/2015 |
| 10,769,712 B1* | 9/2020 | Edwards | G06Q 30/0635 |
| 10,781,053 B1* | 9/2020 | Zhao | B65G 21/02 |
| 2003/0170357 A1* | 9/2003 | Garwood | B65D 81/268 426/392 |
| 2004/0093272 A1* | 5/2004 | Rosenbaum | G06Q 30/06 705/26.8 |
| 2006/0020366 A1* | 1/2006 | Bloom | B07C 3/02 700/226 |
| 2006/0206235 A1* | 9/2006 | Shakes | B65G 1/1373 700/216 |
| 2008/0162305 A1* | 7/2008 | Rousso | G06Q 20/40 705/26.5 |
| 2008/0274241 A1* | 11/2008 | Steuer | A23L 5/30 426/231 |
| 2013/0132193 A1* | 5/2013 | Aihara | G06Q 30/0251 705/14.51 |
| 2013/0247519 A1* | 9/2013 | Clark | B65B 5/00 53/452 |
| 2015/0142594 A1* | 5/2015 | Lutnick | G06Q 50/28 705/21 |
| 2015/0161712 A1* | 6/2015 | Ponzetta | G06Q 30/0201 705/7.29 |
| 2015/0307278 A1* | 10/2015 | Wickham | G05B 15/02 700/216 |
| 2017/0024804 A1* | 1/2017 | Tepfenhart, Jr. | G06Q 30/0635 |
| 2017/0140328 A1 | 5/2017 | Downs et al. | |
| 2017/0161728 A1* | 6/2017 | Satyanarayan | G06Q 20/401 |
| 2018/0197137 A1* | 7/2018 | High | G06Q 10/0832 |
| 2018/0215485 A1* | 8/2018 | Koet | B65B 7/2871 |
| 2019/0152634 A1* | 5/2019 | Almogy | B65G 65/425 |
| 2019/0233213 A1* | 8/2019 | Phan-Quiroga | G06Q 10/087 |
| 2019/0318307 A1* | 10/2019 | Higashida | G06Q 10/0835 |
| 2020/0160428 A1* | 5/2020 | Calvo | G06Q 10/0834 |

OTHER PUBLICATIONS

Howard, "Automated Packaging Systems' New Engineering Integration Services Make Custom Packaging Solutions Highly Productive and Affordable", Business Wire (Sep. 26, 2005), file:///private/var/folders/jq/ yyvckgjj18138d08zjv9bgrh0000gn/T/TemporaryItems/notes/~mo_5559.htm, pp. 1-4.

https://dir.indiamart.com/impcat/automatic-packaging-machines.html, "Automatic Packaging Machines—Automatic Packing Machines Latest Prices, Manufactures & . . .", printed Jan. 4, 2019, pp. 1-21.

PROQUEST "Automated Packaging Systems' New Engineering Integration Services Make Custom Packaging Solutions Highly Productive and Affordable", Publication info: Business Wire (Sep. 26, 2005), Report Information From ProQuest Dialog, 4 pages.

* cited by examiner

POINT OF PURCHASE PACKAGING

FIELD OF INVENTION

This disclosure relates generally to packaging systems, and in particular to point of purchase packaging systems utilizing a network conveyor system.

BACKGROUND OF THE INVENTION

A connected network of various electronic devices that interact and exchange data is often referred to as the Internet of Things (IoT). IoT involves extending internet connectivity beyond the average smartphone or smart watch to other devices which were previously categorized as non-internet enabled devices. An automated conveyor system or automated packaging system in retail logistics are examples of non-internet enabled devices, for which extending the reach of IoT to these non-internet enable devices potentially increases efficiency in processes previously limited by technology.

SUMMARY

Embodiments in accordance with the present invention disclose a method, computer program product and computer system for a point of purchase packaging systems utilizing a network conveyor system, the method, computer program product and computer system can, responsive to receiving a selection of an object at a point of purchase, identify a purchaser defined instruction associated with the selected object for sorting and packaging by a conveyor system. The method, computer program product and computer system can receive data for each object out of a plurality of objects from one or more sensors associated with the conveyor system, wherein the plurality of objects includes the selected object. The method, computer program product and computer system can, responsive to sorting the plurality of objects based on the data received and the purchaser defined instruction associated with the selected object, instruct an automated packaging system to package the plurality of objects based on the sorting. The method, computer program product and computer system can, responsive to determining a first portion of the plurality of objects are packaged for collection at the point of purchase, instruct the conveyor system to send the first portion of the plurality of objects to a first transfer station at the point of purchase for collection by a purchaser of the portion of the plurality of objects.

DETAILED DESCRIPTION

Embodiments of the present invention allow processing orders at a point of purchase utilizing a networked conveyor system, where the network conveyor system has the ability to sort objects in the order based on user provided instructions and information collected by the network conveyor system for each object. A user with an associated client device at a point of purchase location, such as a retail facility or warehouse, can select an object for purchase utilizing the associated client device and provide additional instructions for the object. The network conveyor system can utilizes the provided additional instructions, along with integrated sensors to sort through multiple objects for collection at the point of purchase or for shipping via a parcel service.

Figure 1:
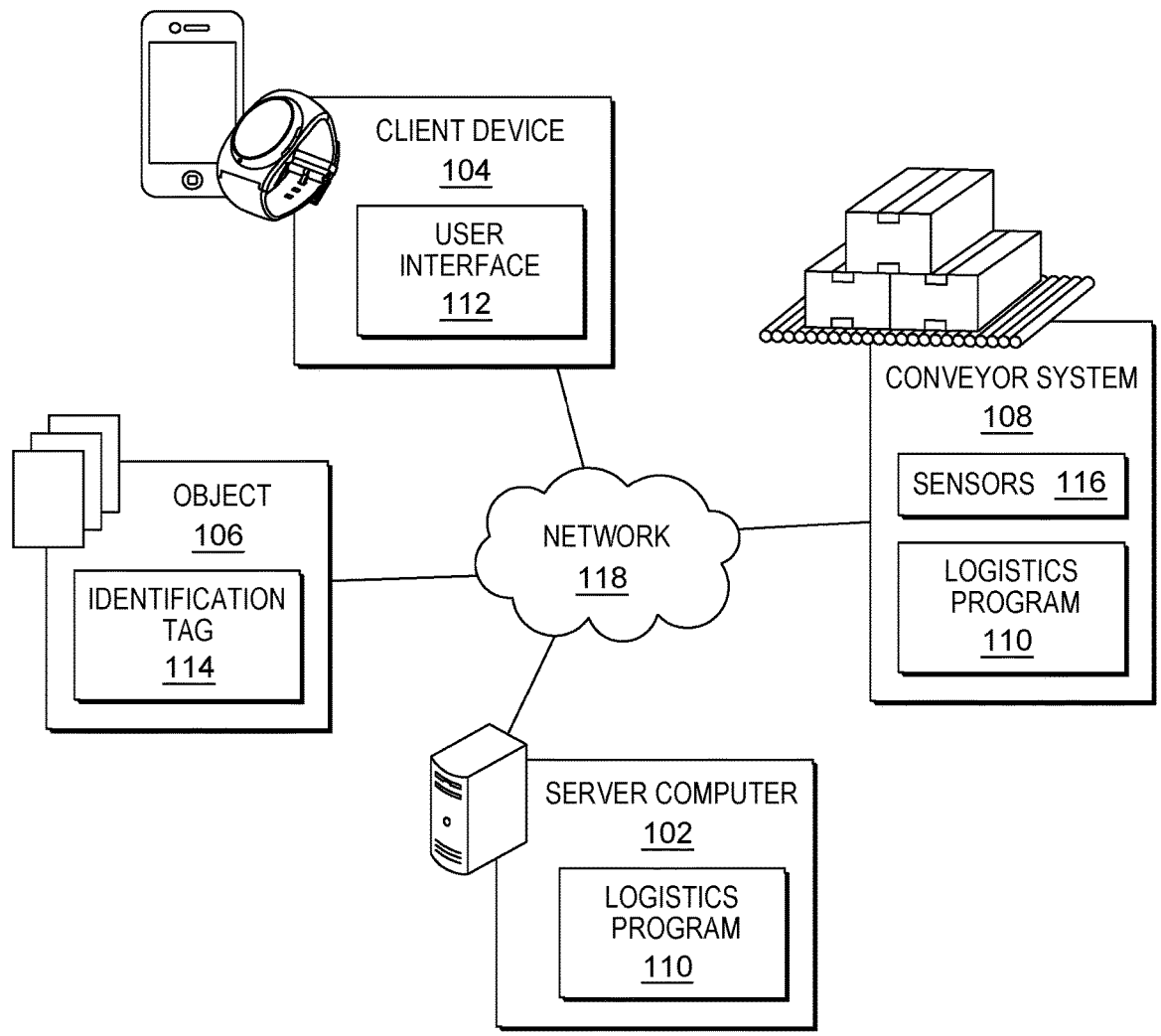
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102, client device 104, object 106, and conveyor system 108 all interconnected over network 118. For discussion purposes, logistics program 110 can operate on server computer 102 or on conveyor system 108.

Server computer 102 may be a desktop computer, a laptop computer, a tablet computer, a specialized computer server, a smartphone, or any computer system capable of executing the various embodiments of logistics program 110. In certain embodiments, server computer 102 represents a computer system utilizing clustered computers and components that act as a single pool of seamless resources when accessed through network 118, as is common in data centers and with cloud computing applications. In general, server computer 102 is representative of any programmable electronic device or combination of programmable electronic devices capable of executing machine-readable program instructions and communicating with other computer devices via a network. Server computer 102 has the ability to communicate with other computer devices (not illustrated in FIG. 1) to query the computer devices for information. In this embodiment, server computer 102 includes logistics program 110 capable of communicating with client device 104, object 106, and logistics program 110 on conveyor system 108.

Client device 104 may be a cellphone, smartphone, smartwatch, laptop, tablet computer, or any other electronic device capable of communicating via network 118. As a user of client device 104 enters a retail facility or warehouse, client device 104 acts as a communication device for delivering instructions to logistics program 110. Client device 104 can utilize location services via a communication provider, Wi-Fi triangulation, or an integrated Global Positioning System (GPS) for identifying a location of the user within the retail facility or warehouse. Additionally, client device 104 has the ability to scan and identify a specific object 106 in the retail facility or warehouse via a unique identification tag 114 associated with the specific object 106. Client device 104 can utilize an integrated radio-frequency identification (RFID) reader or an integrated camera to scan identification tag 114.

Object 106 represents any stock item at the retail facility or warehouse where a user of client device 104 is located. For example, if the retail facility is a home improvement store, object 106 can represent any stock item (e.g., battery pack, hand tool) a shopper (i.e., user of client device 104) might purchase. In another example, if the warehouse is a distribution center for a home improvement store, object 106 can represent any stock item (e.g., pallet of battery packs, pallet of hardware components) a contractor (i.e., user of client device 104) might purchase for collection at the point of purchase or for parcel shipping of the stock item. Object 106 includes identification tag 114 unique to a specific object 106, where identification tag 114 can be an RFID tag, a barcode, matrix barcode (e.g., Quick Response Code (QR code)), a Stock Keeping Unit (SKU), a Universal Product Code (UPC), or any other form of identification which can be captured by client device 104. For every object 106 recognizable by identification tag 114, logistics program 110 includes information such as manufacturer size specification, weight specification, handling instructions, and stored packaging instructions previously received from a user of client device 104.

In this embodiment, identification tag 114 is affixed to object 106, where client device 104 can scan identification tag 114 affixed to object 106. In an alternative embodiment, identification tag 114 is not affixed to object 106 but instead affixed to a secondary electronic device (not illustrated in FIG. 1) displaying object 106, which allows for object 106 to be stored at a secondary location (e.g., warehouse) if object 106 is a larger item.

Conveyor system 108 includes logistics program 110 and sensors 116. In this embodiment, conveyor system 108 has the ability to sort and route multiple objects 108 based on instructions received from client device 104 via logistics program 110. Additionally, conveyor system 108 utilizes sensors 116 to collect data on the multiple objects 106, where logistics program 110 utilizes the collected data to further sort and route the multiple objects 106. Sensors 116 can collect data such as, temperature, moisture levels, and weight. Furthermore, sensors 116 have the ability to scan identification tag 114 on each object 106 that conveyor system 108 sorts and routes, utilizing an RFID reader or QR code reader. Logistics program 110 utilizes the collected data from sensors 116 and the received the instructions from client device 104 to sort and route the multiple objects 106 for packaging. Conveyor system 108 can further sort and route the packaged objects 106 based on whether the packaged objects 106 are to be collected at the point of purchase by the user of client device 104 or the packaged objects 106 are to be passed onto to a parcel service for delivery.

In general, network 118 can be any combination of connections and protocols that will support communications between server computer 102, client device 104, object 106, and conveyor system 108. Network 118 can include, for example, a local area network (LAN), a wide area network (WAN), such as the internet, a cellular network, or any combination of the preceding, and can further include wired, wireless, and/or fiber optic connections. In one embodiment, logistics program 110 can be a web service accessible via network 118 to a user of client device 104. In another embodiment, logistics program 110 may be operated directly by a user of server computer 102.

Figure 2:
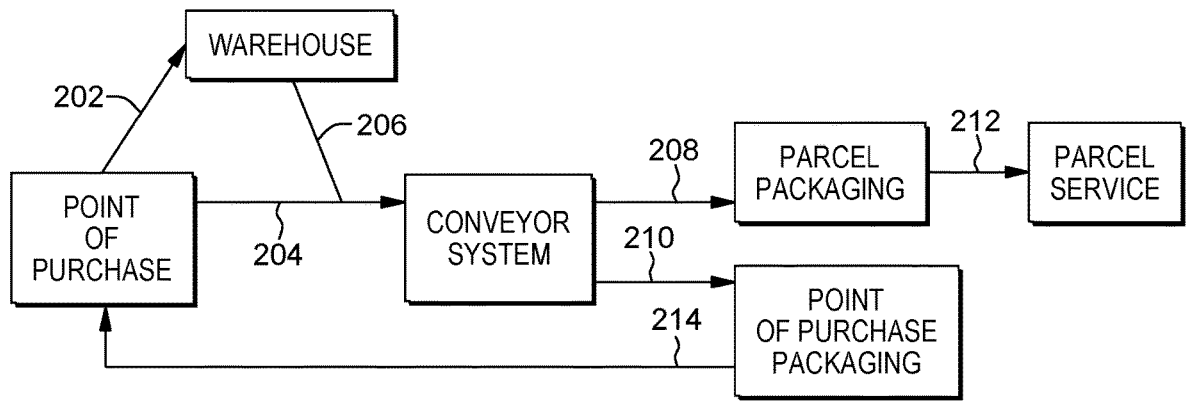
FIG. 2 is a process flow of a logistics program, in accordance with an embodiment of the present invention.

FIG. 2 is a process flow of a logistics program, in accordance with an embodiment of the present invention. In this embodiment, logistics program 110 is operating in a setting where the point of purchase includes a warehouse location for stocking additional items. As a user of client device 104 selects object 106 via identification tag 114, logistics program 110 receives the selection of object 106 at the point of purchase, along with an instruction for packaging object 106. Logistics program 110 has the ability to route the selection of object 106 to a warehouse (202) or route object 106 directly to conveyor system 108 from the point of purchase (204). Logistics program 110 routes the selection of object 106 to the warehouse or routes object 106 directly from the point of purchase to conveyor system 108 depending on instructions provided by the user of client device 104 and properties of object 106. Upon receiving object 106 from the warehouse, logistics program 110 routes object 106 from the warehouse to conveyor system 108 (206).

In one example, object 106 is to be collected at the point of purchase by the user of client device, logistics program 110 routes object 106 from the point of purchase to conveyor system 108 (204). However, if object 106 is to be delivered via a parcel service, logistics program 110 routes the selection of object 106 to the warehouse (202), where logistics program 110 instructs the warehouse to route object 106 directly to conveyor system 108. Routing object 106 directly from the warehouse versus the point of purchase, eliminates the need to re-stock the item at the point of purchase. In another example, logistics program 110 identifies object 106 based on identification tag 114 scanned by client device 104 and logistics program 110 determines whether object 106 is stocked at the point of purchase or at the warehouse. If logistics program 110 determines object 106 is a larger item (e.g., pallet of battery packs) based on the identification tag 114, logistics program 110 routes the selection of object 106 to the warehouse (202). If logistics program 110 determines object 106 is a smaller item (e.g., a single battery pack) based on the identification tag 114, logistics program 110 routes object 106 directly from the point of purchase.

Logistics program 110 instructs conveyor system 108 to sort through multiple object 106 based on the instructions provided by user of client device 104 and data received from sensors 116 on conveyor system 108, upon which logistics program 110 routes objects 106 to either parcel packaging (208) or point of purchase packaging (210). Logistics program 110 routes object 106 to parcel packaging if one or more objects 106 are to be delivered to the user of client device 104 via a parcel service, where the one or more objects 106 are packaged for delivery at parcel packaging. Logistics program 110 determines a destination (e.g., residential address, business address) to which the one or more objects 106 are to be delivered based on the instructions provided by the user of client device 104. Logistics program 110 routes object 106 to point of purchase packaging for one or more objects 106 which are to be collected by the user of client device 104 at the point of purchase. Logistics program 110 receives the one or more objects 106 at the point of purchase packaging, where the one or more objects 106 are packaged based on instructions provided by user of client device 104 and data received from sensors 116 on conveyor system 108.

Subsequent to the one or more objects 106 being packaged at parcel packaging, logistics program 110 forwards the packaged one or more objects 106 for delivery by the parcel service (212). Alternatively, subsequent to the one or more objects 106 being packaged at point of purchase packaging, logistics program 110 routes the packaged one or more objects 106 for collection by the user of client device 104 at the point of purchase (214). The point of purchase location can include a designated area (e.g., building exit or designated parking spot), where the one or more objects 106 packaged at the point of purchase packaging are collected by the user of client device 104

Figure 3:
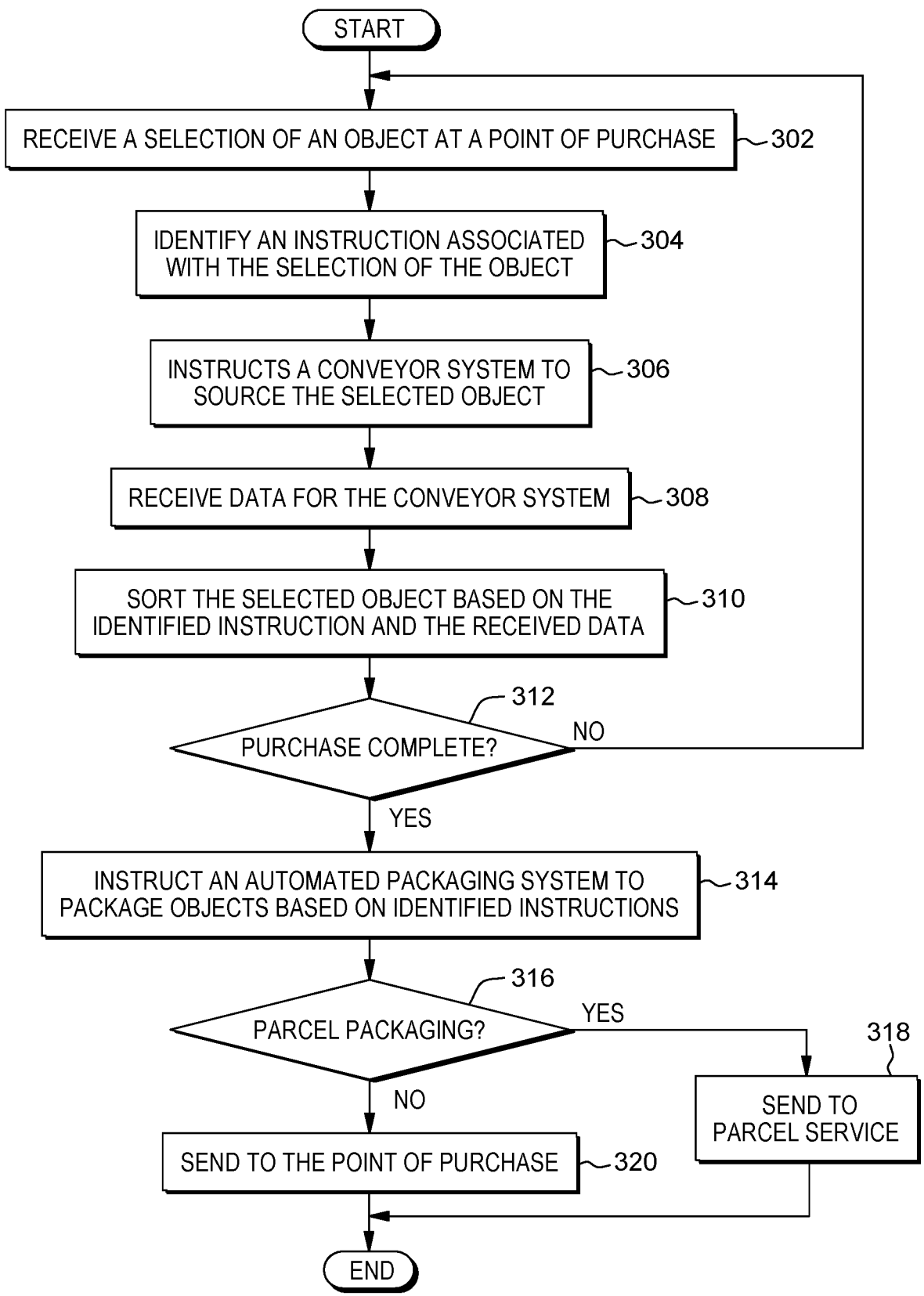
FIG. 3 is a flowchart depicting operational steps of a logistics program for processing orders at a point of purchase utilizing a networked conveyor system, in accordance with an embodiment of the present invention.

FIG. 3 is a flowchart depicting operational steps of a logistics program for processing orders at a point of purchase utilizing a networked conveyor system, in accordance with an embodiment of the present invention.

Logistics program 110 receives (302) a selection of an object at a point of purchase. In this embodiment, an object represents any item available for purchase at a retail location (i.e., point of purchase), where each object is identifiable by an identification tag. In one example, a retail location is a parts wholesaler for electronic products, where an object can include items such as, a battery pack, transformer, resistors, or printed circuit boards. The parts wholesaler can include a retail location and a warehouse location from which one or more objects can be sourced. In another example, a retail location is a general supply store, where an object can include items such as, produce, cleaning supplies, storage supplies, and home tools. The general supply store can include a retail location and a warehouse location from which one or more objects can be sourced, where the retail location can further include customer and non-customer accessible stock.

In this embodiment, logistics program 110 receives a selection of an object at a point of purchase via an input on a client device associated with a user, where the user represents a customer at the point of purchase. The user of client device can scan an identification tag (e.g., RFID or QR code) associated with an object, where logistics program 110 has the ability to identify the selected object based on the scanned identification tag. Alternatively, the user of client device provides a verbal input to a client device, wherein the verbal input identifies the object. Logistics program 110 can utilize a natural language processing component to decipher the verbal input for an object name, a product name, a product number, a Stock Keeping Unit (SKU), or a Universal Product Code (UPC) which is unique to an object at the point of purchase. For example, logistics program 110 receives a verbal input stating "BPK1235A" as a selection for an object at the point of purchase, where logistics program 110 utilizes the natural language processing component to identify the verbal input as an SKU assigned to a "Battery Pack 1235—Type A". Subsequent to receiving the selection of the object via a verbal input, logistics program 110 can display a confirmation on a user interface on the client device associated with the user identifying the selection of the object.

The object selection logistics program 110 receives also includes an instruction provided by the user of the client device for sorting and packaging of the selected object in the form of a verbal command or a physical user interface command. A verbal command is any audible command received by the client device associated with the user for the selected object. A physical user interface command is any manual input (e.g., user interface selection or typed command) provided by the user of the client device. Based on the received selection of the object at the point of purchase, logistics program 110 can further identify available information for the selected object such as manufacturer size specification, weight specification, handling instructions, and package storing instructions previously received from a user of client device. Logistics program 110 utilizes this available information, along with the instruction received with the object selection, for object sorting and packaging.

Logistics program 110 identifies (304) an instruction associated with the selection of the object. In this embodiment, logistics program 110 receives a verbal command for sorting and packaging the selected object at the point of purchase. Logistics program 110 can utilize a natural language processing component to decipher the verbal command to identify an instruction for the selected object. For example, logistics program 110 receives a verbal command stating "ship to work address" and logistics program 110 determines to route the selected object to parcel packaging for delivery by a parcel service. Logistics program 110 can store various addresses for each user, where each address includes a title (e.g., work address, home address, site address) for rapid input verses manually inputting an address for every selected objected requiring delivery. The verbal command can further include an instruction on how the selected object is to be package for delivery. Continuing from the previous example, the verbal command stating "ship to work address" can include a further instruction of "and package with item BPK1235A and item BPK1235B". Logistics program 110 identifies a first portion of the instruction as the selected object requiring parcel packaging and a second potion of the instruction as the selected object requiring parcel packaging with two items, "BPK1235A" and "BPK1235B". In this embodiment, logistics program 110 identifies the second portion of the instruction as an object selection of the two items, "BPK1235A" and "BPK1235B". In an alternative embodiment, logistics program 110 identifies the second portion of the instruction and promotes a user via a user interface of client device to select the two items, "BPK1235A" and "BPK1235B".

In another embodiment, logistics program 110 receives a physical user interface command for sorting and packaging the selected object at the point of purchase. Logistics program 110 can display multiple selectable instructions in a user interface of the client device associated with the user for sorting and packaging the selected objects, where the selectable instructions in the user interface represent the physical user interface command. In one example, the selectable instructions include an option for either point of purchase packaging for collection by the user at the point of purchase or parcel packaging for delivery by a parcel service. In another example, the selectable instructions include an option for choosing one or more previously selected objects for packaging along with the currently selected objected. Logistics program 110 can display a list of the one or more previously selected objects, where logistics program 110 can received a user input identifying which of the one or more previously objects are to be packaged with the currently selected object.

In yet another example, the selectable instructions include an option to group one or more previously selected objects for packaging along with the currently selected objected based on one or more categories. The categories can include temperature ranges, weight ranges, volume ranges, dimensional ranges, and fragility ratings. Temperature ranges represent a temperate at which an object is to be stored and can include x<0° C. for frozen objects, 4.4° C.>x>0° for refrigerated objects, and 4.4° C.<x for all other objects. Logistics program 110 can provide a selectable instructions to group frozen objects together, to prevent non-frozen objects from being damaged. Weight ranges represent a weight for which one or more objects are to be grouped to prevent damage to packaged items due to a heavier object impacting a lighter object. Logistics program 110 can provide a selectable instructions to group lighter objects (e.g., x<1 lbs.) and heavier objects (e.g., x>1 lbs.) in two separate categories. Additionally, the weight ranges can be defined by a parcel service to limit an amount of weight in a single package that includes multiple objects. Volume ranges represent a volume of an object, where logistics program 110 can provide grouping of larger objects and smaller objects based on packaging requirement for both, collection at the point of purchase or for parcel delivery.

Dimensional ranges represent a threshold value for each dimensional value of length width, and height. Logistics program 110 can provide a grouping of objects based on one or more threshold values (e.g., 1 meter and 2 meters) for packaging requirements for both, collection at the point of purchase or for parcel delivery. For objects with a dimensional value that exceeds the threshold and is outside of the dimensional range for collection at the point of purchases, logistics program 110 can route the object for parcel delivery. Fragility ratings represent susceptibility to damage when an object is packaged with one or more objects or when an object is packaged for parcel deliver. For example, logistics program 110 can assign electronic equipment a higher fragility rating due to a higher susceptibility to damage during shipping and handling.

Logistics program 110 instructs (306) a conveyor system to source the selected object. In this embodiment, logistics program 110 utilizes a conveyor system connected to the point of purchase location and a warehouse location to source the selected object. When sourcing the selected object, logistics program 110 determines whether to source the object from the point of purchase or the warehouse location. For objects to be packaged for parcel delivery, logistics program 110 instructs the conveyor system to source the selected product from the warehouse location to reduce re-stocking requirements of the selected object at the point of purchase. For objects to be packaged for collection at the point of purchase, logistics program 110 instructs the conveyor system to source the selected objects from the point of purchase. For objects gathered by a user at the point of purchase logistics program 110 receives the objects at a designated area, where logistics program 110 instructs the conveyor system to accept (i.e., source) the objects at the designated area. For objects not gathered by the user at the point of purchase, logistics program 110 instructs the conveyor system to source the selected objects from available stock at the point of purchase.

Logistics program 110 receives (308) data for the conveyor system. In this embodiment, logistics program 110 receives data from multiple sensors associated with the conveyor system, where the multiple sensors gather data including temperature, moisture levels, and weight. Logistics program 110 has the ability to associate the received data for the conveyor system with a selected object previously sourced by the conveyor system in (306) via selective placement of the multiple sensors. For example, the conveyor system can include a portion where an identification tag associated with an object is scanned and data from the multiple sensors is gathered, thus associating the gathered data with the scanned object. Logistics program 110 utilizes the data from the multiple sensors associated with the conveyor system, along with the previously identified instruction in (304) and previously identified information such as manufacturer size specification, weight specification, handling instructions, and package storing instructions in (302) for sorting of objects in the conveyor system.

Additionally, logistics program 110 utilizes the temperature, moisture levels, and weight data gathered to remove one or more objects from the conveyor system if the data does not match the previously identified information. In one example, logistics program 110 previously identified package storing instructions as requiring the selected object to be stored in a x<0° C. temperature range. In the event logistics program 110 receives temperature data from the conveyor system for the selected object outside of that range (i.e., x≥0° C.), logistics program 110 instructs the conveyor system to remove the selected object due to the received data from the conveyor system not meeting the previously identified package storing instructions. In another example, logistics program 110 previously identified weight specification for a selected object as 16.8 ounces. In the event logistics program 110 receives weight data from the conveyor system for the selected object out of margin of error range (e.g., ±0.5 ounces), logistics program 110 instructs the conveyor system to remove the selected object due to the received date from the conveyor system exceeding a margin of error range for the previously identified weight specification for the selected object.

Subsequent to logistics program 110 receiving data for the conveyor system, logistics program 110 has the ability to provide a recommendation to user via client device based on the received data. In one example, logistics program 110 receives data that includes a temperature reading below 0° C. for the selected object and generates a recommendation to the user to package the selected object with other objects in the x<0° C. temperature range. In another example, logistics program 110 receives data for a moisture level of a selected object that includes a humidity of 95% and generates a recommendation to the user to package the selected object individually to avoid damage to other objects. In another embodiment, logistics program 110 has the ability to instruct the conveyor system to sort one or more objects based on the data for the conveyor system if a particular rule is met that supersedes any other instruction identified in (304). In an example, logistics program 110 includes a particular rule to not package objects for delivery by a parcel service is a temperature of an object is outside of the x≥0° C. range. In the event logistics program 110 receives data that includes a temperature reading below 0° C. for a selected object, logistics program 110 determines the selected object is to be collected at the point of purchase by the user and sorts the selected object accordingly.

Logistics program 110 sorts (310) the selected object based on the identified instruction and the received data. In this embodiment, logistics program 110 sorts the selected object by instructing the conveyor system to route and group multiple objects based on packaging requirements for the multiple objects. For example, based on the identified instruction in (304) and the received data for the conveyor system in (308), logistics program 110 instructs the conveyor system to sort the multiple objects based on which of the multiple objects are to be packaged together. Furthermore, the multiple objects are sorted based on whether the packages are to be collected by a user at the point of purchase or to be delivered by a parcel service.

Logistics program 110 determines (312) whether the purchase is complete. In the event logistics program 110 determines the purchase is complete ("yes" branch, 312), logistics program 110 instructs (314) an automated packaging system to package items based on identified instructions. In the event logistics program 110 determines the purchase is not complete ("no" branch, 312), logistics program 110 reverts to receiving (302) a selection of an object at a point of purchase.

Logistics program 110 instructs (314) an automated packaging system to package objects based on identified instructions. In the embodiment, logistics program 110 instructs the automated packaging system integrated into the conveyor system, to package multiple objects for collection at the point of purchase or for delivery by the parcel service. Instructions that logistics program 110 previously identified can include the grouping and packaging of objects with similar temperature ranges, weight ranges, volume ranges, dimensional ranges, and fragility ratings. For temperature ranges, logistics program 110 can instruct the automated packaging system to package colder items in the x<0° C. temperature range together and utilize insulated packing materials to prolong the x<0° C. temperature range. Additionally, logistics program 110 can instruct the automated packaging system to package warmer items in the x>30° C.

temperature range together and utilize heat resistant packing materials to prolong the x>30° C. temperature range.

For weight ranges, logistics program 110 can instruct the automated packaging system to distribute the weight of two or more objects to be packaged, such that weight from the one or more objects is not concentrated on portion of the package. For objects exceeding a weight range for packaging objects, logistics program 110 can instruct the automated packaging system to bypass the packaging of the object and send the object directly to the point of purchase for collection or to the parcel service for delivery. Similarly, logistics program 110 can instruct the automated packaging system to bypass the packaging of an object if the volume exceeds a specific value or if a measured value for the dimensions of the object exceeds a specific value. For fragility ratings, logistics program 110 can instruct the automated packaging system to include additional packing material such as crinkle paper or air cushions between two or more objects in a package. Furthermore, logistics program 110 can select the packaging material for each object based on the instruction provided by the purchaser.

For packages containing one or more objects for collection at the point of purchase, logistics program 110 can instruct the automated packaging system to affix an identification label to each of the packages, wherein the identification label includes a name of the purchaser and a purchase number. For packages containing one or more objects for delivery by a parcel service, logistics program 110 can instruct the automated packaging system to affix a shipping label to each of the packages.

Logistics program 110 determines (316) whether any of the packaged objects include parcel packaging. In the event logistics program 110 determines a portion of the packaged objects include parcel packaging ("yes" branch, 316), logistics program 110 sends (318) the portion of the packaged objects to the parcel service. In the event logistics program 110 determines the packaged objects do not include parcel packaging ("no" branch, 316), logistics program 110 sends (320) the packaged objects to the point of purchase.

Logistics program 110 sends (318) the portion of the packaged objects to the parcel service. In this embodiment, logistics program 110 a portion of the packaged objects to the parcel service for delivery and another portion of the packaged objects to the point of purchase for collection by the purchaser. Logistics program 110 instructs the conveyor system to send the portion of the packaged objects to a transfer station for collection by the parcel service, where the parcel service collects the portion of the packaged item for delivery to the purchaser at a previously specified address. Alternatively, logistics program 110 sends (320) the packaged objects to the point of purchase. Logistics program 110 instructs the conveyor system to send the other portion of the packaged objects to another transfer station for collection by the purchaser at the point of purchase.

Figure 4:
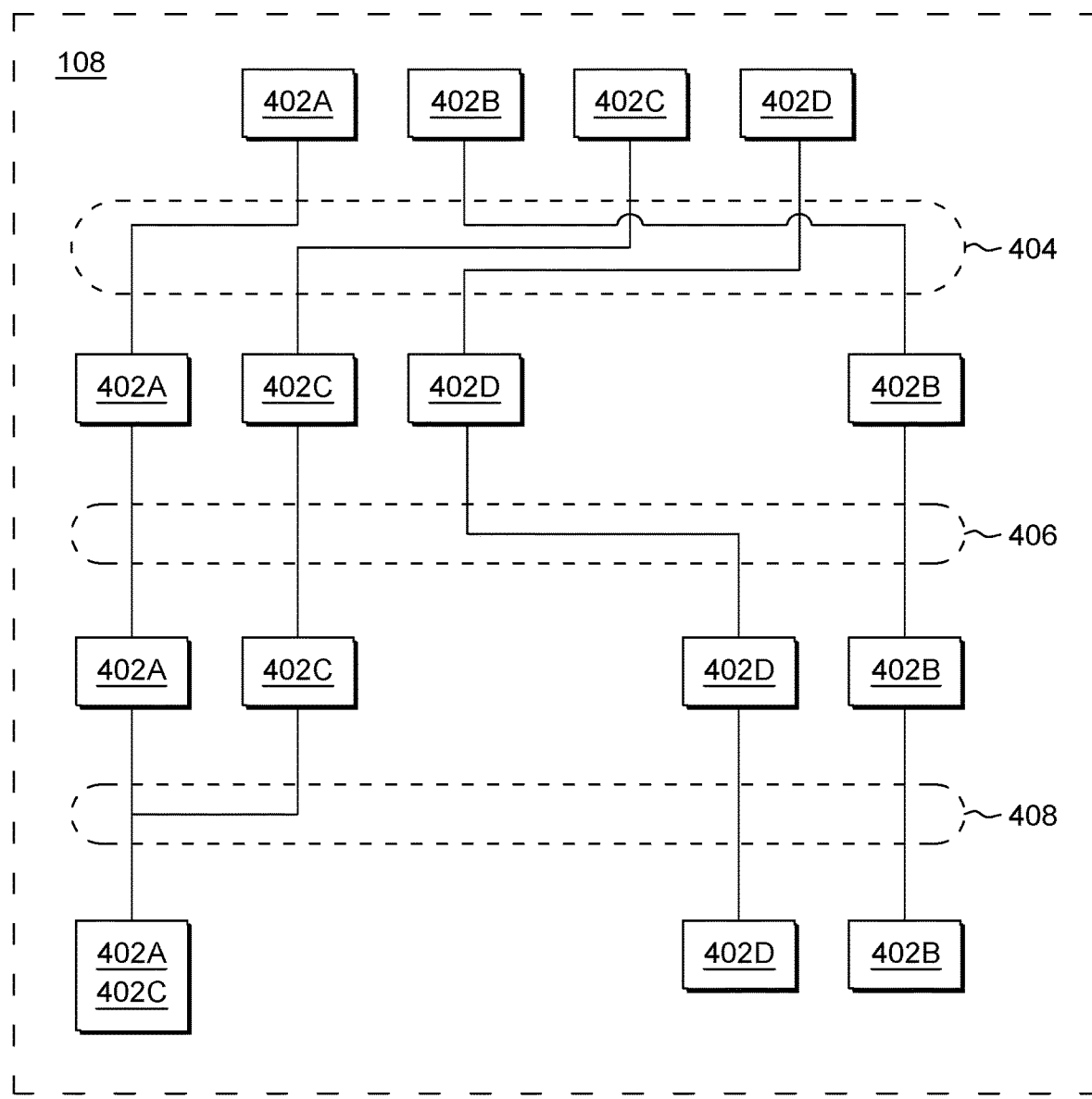
FIG. 4 is an example of a process flow of a logistics program, in accordance with an embodiment of the present invention.

FIG. 4 is an example of a process flow of a logistics program, in accordance with an embodiment of the present invention.

In this example, logistics program 110 receives a selection of objects 402A, 402B, 402C, and 402D for packaging, along with a corresponding instruction for each of the objects. Logistics program 110 is operating at a retail location for a parts wholesaler for electronic products, where an object 402A is a box of resistors, object 402B is a transformer, object 402C is a printed circuit board, and object 402D is a battery pack. Subsequent to logistics program 110 instructing conveyor system 108 to source objects 402A, 402B, 402C, and 402D, logistics program 110 receives data for conveyor system 108 from multiple sensors. Logistics program 110 sorts objects 402A, 402B, 402C, and 402D based on the corresponding instructions for each of the objects and the data received for conveyor system 108 from the multiple sensors. Phase 404 represents logistics program 110 instructing conveyor system 108 to sort the objects based on whether the corresponding instructions for each object specifies if the object is to be collected at the point of purchase or delivered by a parcel service. In this embodiment, logistics program 110 determines object 402A, 402C, and 402D are to be packaged for delivery by a parcel service and object 402B is to be packaged for collection at the point of purchase.

Phase 406 represents logistics program 110 instructing conveyor system 108 to sort the objects based on whether the corresponding instructions for each object specifies packaging restrictions based on manufacturer specifications. In this embodiment, object 402D is a battery pack that includes a packaging restriction present in the manufacturer specifications stating that the battery pack cannot be shipped utilizing an air parcel service for delivery. Additionally, logistics program 110 determines that objects 402A, 402C, and 402D each include an instructions provided by the purchaser requesting for each of the objects to be delivered overnight by an air parcel service (i.e., overnight air shipping). Logistics program 110 determines the packaging instruction from the manufacturer specification supersedes the instruction provided by the purchases and logistics program 110 instructs conveyor system 108 to route object 402D to packaging for collection at the point of purchase.

Phase 408 represents logistics program 110 instructing an automated packaging system of conveyor system 108 to packages objects 402A, 402B, 402C, and 402D based on the instructions corresponding to each object. Logistics program 110 previously determined that objects 402A and 402C each include an instruction provided by the purchaser requesting each of the objects to be delivered overnight by an air parcel service. Since additional packaging instructions were not provided for object 402A and 402C specifying whether or not the two objects can be combined in single package, logistics program 110 defaults to instructing the automated packaging system to combine objects 402A and 402C into a single package for delivery by the air parcel service. Alternatively, if additional packaging instructions were provided for object 402A and 402C specifying not to combine the two objects into a single object, logistics program 110 would instruct the automated packaging system to package objects 402A and 402C separately for delivery by the air service. For objects 402b and 402D, logistics program 110 determines that if both objects are packaged together, the weight of both objects would exceed a weight range. Therefore, logistics program 110 instructs automated packaging system to package object 402B and 402D individually for collection by the purchaser at the point of purchase.

Embodiments of the present invention provide a unique identification tag associated with every item (i.e., object) on a shelf in a retail store or warehouse, where the unique identification tag is an RFID tag or QR Code. As an individual is purchasing items at the retail store or warehouse, a client device such as a smartphone or smart watch is capable of capturing content spoken by the individual and scanning the unique identification tag associated with an item. Logistics program 110 stores details for every item, including but not limited to item specification and packaging instructions as provided by a manufacturer of the item. Item specification includes dimensions for every item and logistics program 110 can determine how much packaging is required for one or more items based on the dimensions of the one or more items. Additionally, logistics program 110 stores information regarding compatibility of two or more items and whether the two or more items can be packaged together. For example, logistics program 110 can include compatibility information such as, a cleaning supply item should not be packaged with a food item.

While the individual is in the retail store or warehouse, logistics program 110 can receive instructions via the smartwatch or smartphone, where the instruction includes custom packaging needs for a specific item. The instruction can either be spoken or manually inputted into the smartwatch or smartphone and logistics program 110 can associate the instruction with a specific item based on the identification tag scanned by the smartwatch or smartphone. Logistics program 110 can identify where the item is stocked or if the item is present in a shopping cart associated with the individual. For an item present in the shopping cart, logistics program 110 can utilize a threshold time limit, where if an item is not kept in the shopping cart for more than a threshold amount of time, the instruction provided by the individual becomes null and void. Logistics program 110 receives item selection (i.e., scan) and custom item packaging instructions, and stores the information until the individual has completed shopping at the retail location or warehouse. Logistics program 110 can receive multiple instructions at different points in time and logistics program 110 can replace existing instructions or update the existing instructions based on contextual analysis performed on the instructions received.

Subsequent to the completion of the individual shopping at the retail location or warehouse, logistics program 110 in conjunction with a conveyor system identifies each item and identifies the item specification, combability of packaging with other items, and any other instruction provided by the individual shopping at the retail location or warehouse. Based on the type of available packaging, logistics program 110 sorts the items and cluster items (i.e., groups) for packaging. Logistics program 110 can source items from the retail store, a warehouse location, or directly from a shopping cart of the individual. Sensors embedded on the conveyor system recognize items via the identification tags and logistics program 110 instructs the conveyor system to cluster the items. The conveyor system can include different points of packaging for different types of packaging such as, gift packaging, parcel packaging for shipping, and packaging for point of purchase collection by the individual. Furthermore, logistics program 110 can identify packaged items for collection by the individual at the point of purchase or for delivery by a parcel service.

Logistics program 110 can also include an artificial intelligence (AI) component, where the AI component learns an individual's packaging preferences and provides directions and suggestions based on the established packaging preferences. The AI component can also detect patterns like delivery preferences on a Wednesday and in-store shopping on a Sunday, which allows for a retailer to manage inventory based on consumer demand levels. Logistics program 110 can provide options for environmental friendly (i.e., recyclable materials) for utilization in the package of the item being purchased by the individual.

Figure 5:
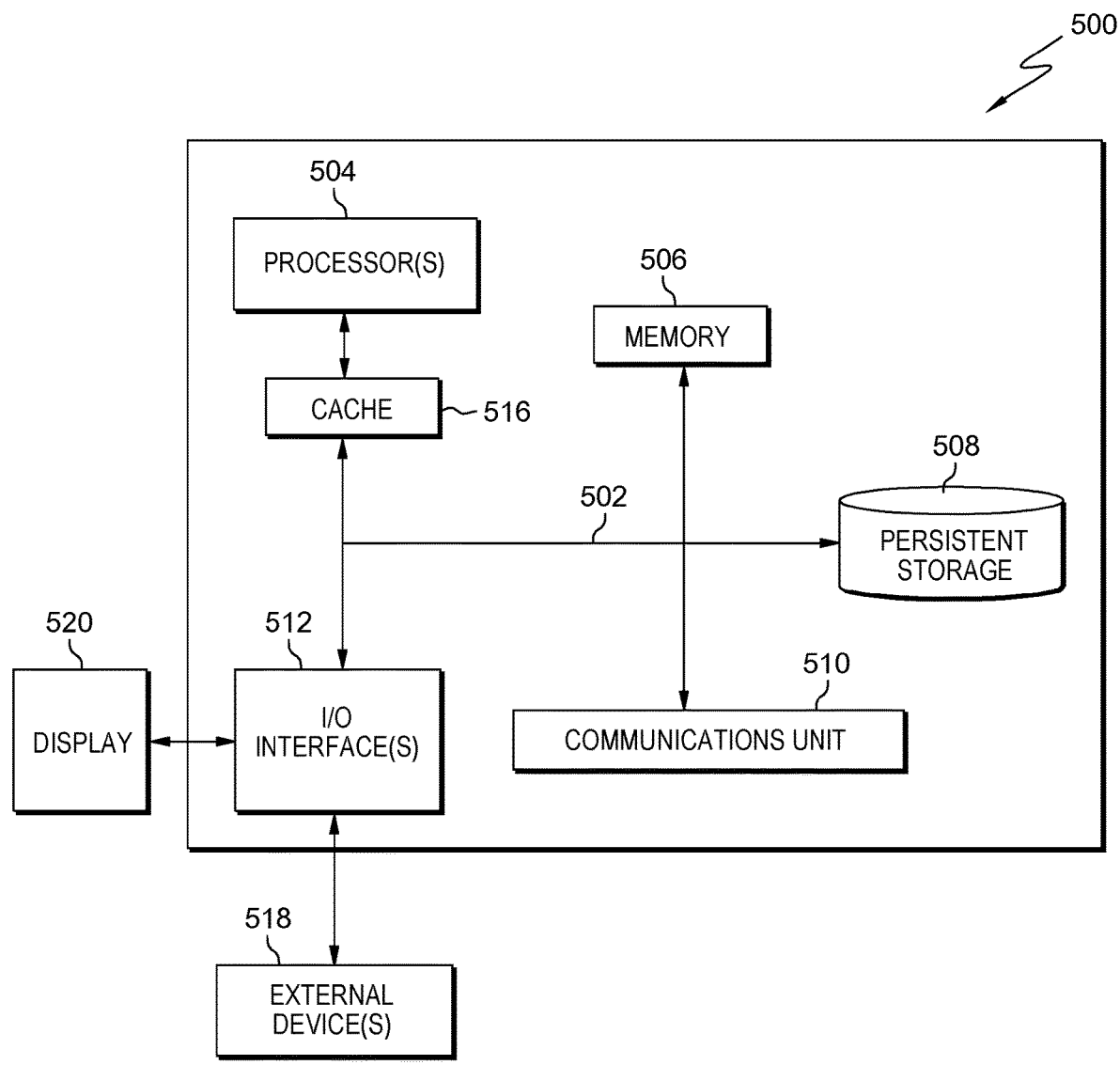
FIG. 5 is a block diagram of components of a computer system, such as the server computer of FIG. 1, in accordance with an embodiment of the present invention.

FIG. 5 depicts computer system 500, where server computer 102 and conveyor system 108 are examples of a system that include logistics program 110. The computer system includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 502 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 506 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving, by one or more processors, a first verbal input for a selection of an object and an instruction associated with the selected object at a point of purchase;

receiving, by one or more processors, a second verbal input for a purchaser defined instruction associated with the selected object for sorting and packaging by a conveyor system;

receiving, by one or more processors, data for each object out of a plurality of objects from one or more sensors associated with the conveyor system, wherein the plurality of objects includes the selected object;

responsive to sorting the plurality of objects based on the data received and the purchaser defined instruction associated with the selected object, instructing, by one or more processors, an automated packaging system to package the plurality of objects based on the sorting; and responsive to determining a first portion of the plurality of objects are packaged for collection at the point of purchase, instructing, by one or more processors, the conveyor system to send the first portion of the plurality of objects to a first transfer station at the point of purchase for collection by a purchaser of the first portion of the plurality of objects, wherein the first portion of the plurality of objects includes the selected object.

2. The method of claim 1 further comprising:

instructing, by one or more processors, the conveyor system to send a second portion of the plurality of objects to a second transfer station for collection by a parcel service for delivery to an address provided by the purchaser.

3. The method of claim 2, wherein instructing an automated packaging system to package the plurality of objects based on the sorting, further comprises:

instructing, by one or more processors, the automated packaging system to package the first portion of the plurality of objects in at least one package utilizing packaging material provided in the purchaser defined instruction; and instructing, by one or more processors, the automated packaging system to package the second portion of the plurality of objects, wherein each object in the second portion of the plurality of objects is packaged.

4. The method of claim 1, further comprising:

identifying, by one or more processors, manufacturer defined instructions associated with the selected object for sorting and packaging by the conveyor system, wherein the manufacturer defined instructions include size specification, weight specification, handling instructions, and stored packaging instructions; and sorting, by one or more processors, the plurality of objects based on the manufacturer defined instructions, wherein the manufacturer instructions supersedes the purchaser defined instruction.

5. The method of claim 4, further comprising:

responsive to determining the data received for the selected object does not meet the manufacturer defined instruction, instructing, by one or more processors, the conveyor system to remove the selected object prior to sorting the plurality of objects.

6. A computer program product comprising:

one or more computer readable storage media and program instructions stored on at least one of the one or more storage media, the program instructions comprising:

program instructions to receive a first verbal input for a selection of an object and an instruction associated with the selected object at a point of purchase;

program instructions to receive a second verbal input for a purchaser defined instruction associated with the selected object for sorting and packaging by a conveyor system;

program instructions to receive data for each object out of a plurality of objects from one or more sensors associated with the conveyor system, wherein the plurality of objects includes the selected object;

program instructions to, responsive to sorting the plurality of objects based on the data received and the purchaser defined instruction associated with the selected object, instruct an automated packaging system to package the plurality of objects based on the sorting; and program instructions to, responsive to determining a first portion of the plurality of objects are packaged for collection at the point of purchase, instruct the conveyor system to send the first portion of the plurality of objects to a first transfer station at the point of purchase for collection by a purchaser of the first portion of the plurality of objects, wherein the first portion of the plurality of objects includes the selected object.

7. The computer program product of claim 6, further comprising program instructions, stored on the one or more computer readable storage media, which when executed by a processor, cause the processor to:

instruct the conveyor system to send a second portion of the plurality of objects to a second transfer station for collection by a parcel service for delivery to an address provided by the purchaser.

8. The computer program product of claim 7, wherein instructing an automated packaging system to package the plurality of objects based on the sorting, further comprises program instructions, stored on the one or more computer readable storage media, which when executed by a processor, cause the processor to:

instruct the automated packaging system to package the first portion of the plurality of objects in at least one package utilizing packaging material provided in the purchaser defined instruction; and instruct the automated packaging system to package the second portion of the plurality of objects, wherein each object in the second portion of the plurality of objects is packaged.

9. The computer program product of claim 6, further comprising program instructions, stored on the one or more computer readable storage media, which when executed by a processor, cause the processor to:

identify manufacturer defined instructions associated with the selected object for sorting and packaging by the conveyor system, wherein the manufacturer defined instructions include size specification, weight specification, handling instructions, and stored packaging instructions; and sort the plurality of objects based on the manufacturer defined instructions, wherein the manufacturer instructions supersedes the purchaser defined instruction.

10. The computer program product of claim 9, further comprising program instructions, stored on the one or more computer readable storage media, which when executed by a processor, cause the processor to:

responsive to determining the data received for the selected object does not meet the manufacturer defined instruction, instruct the conveyor system to remove the selected object prior to sorting the plurality of objects.

11. A computer system comprising:

one or more computer processors;

one or more computer readable storage media; and program instructions stored on the computer readable storage media for execution by at least one of the one or more computer processors, the program instructions comprising:

program instructions to receive a first verbal input for a selection of an object and an instruction associated with the selected object at a point of purchase;

program instructions to receive a second verbal input for a purchaser defined instruction associated with the selected object for sorting and packaging by a conveyor system;

program instructions to receive data for each object out of a plurality of objects from one or more sensors associated with the conveyor system, wherein the plurality of objects includes the selected object;

program instructions to, responsive to sorting the plurality of objects based on the data received and the purchaser defined instruction associated with the selected object, instruct an automated packaging system to package the plurality of objects based on the sorting; and program instructions to, responsive to determining a first portion of the plurality of objects are packaged for collection at the point of purchase, instruct the conveyor system to send the first portion of the plurality of objects to a first transfer station at the point of purchase for collection by a purchaser of the first portion of the plurality of objects, wherein the first portion of the plurality of objects includes the selected object.

12. The computer system of claim 11, further comprising program instructions, stored on the one or more computer readable storage media, which when executed by a processor, cause the processor to:

Instruct the conveyor system to send a second portion of the plurality of objects to a second transfer station for collection by a parcel service for delivery to an address provided by the purchaser.

13. The computer system of claim 12, wherein instructing an automated packaging system to package the plurality of objects based on the sorting, further comprises program instructions, stored on the one or more computer readable storage media, which when executed by a processor, cause the processor to:

instruct the automated packaging system to package the first portion of the plurality of objects in at least one package utilizing packaging material provided in the purchaser defined instruction; and instruct the automated packaging system to package the second portion of the plurality of objects, wherein each object in the second portion of the plurality of objects is packaged.

14. The computer system of claim 11, further comprising program instructions, stored on the one or more computer readable storage media, which when executed by a processor, cause the processor to:

identify manufacturer defined instructions associated with the selected object for sorting and packaging by the conveyor system, wherein the manufacturer defined instructions include size specification, weight specification, handling instructions, and stored packaging instructions; and sort the plurality of objects based on the manufacturer defined instructions, wherein the manufacturer instructions supersedes the purchaser defined instruction.

15. The computer system of claim 14, further comprising program instructions, stored on the one or more computer readable storage media, which when executed by a processor, cause the processor to:

responsive to determining the data received for the selected object does not meet the manufacturer defined instruction, instruct the conveyor system to remove the selected object prior to sorting the plurality of objects.

* * * * *